(12) United States Patent
Hayakawa et al.

(10) Patent No.: US 9,778,457 B2
(45) Date of Patent: Oct. 3, 2017

(54) LIGHT DEFLECTOR AND POLYGON MIRROR

(71) Applicant: BROTHER KOGYO KABUSHIKI KAISHA, Nagoya-shi, Aichi-ken (JP)

(72) Inventors: Kazuhiro Hayakawa, Nagoya (JP); Toshio Sakai, Nagoya (JP); Hidetaka Hoshino, Nukata-gun (JP); Junji Fujitani, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 14 days.

(21) Appl. No.: 14/616,165

(22) Filed: Feb. 6, 2015

(65) Prior Publication Data

US 2015/0226958 A1    Aug. 13, 2015

(30) Foreign Application Priority Data

Feb. 12, 2014   (JP) .................................. 2014-024040
Feb. 12, 2014   (JP) .................................. 2014-024041
Feb. 12, 2014   (JP) .................................. 2014-024042

(51) Int. Cl.
  *G02B 26/12*   (2006.01)
  *G02B 5/09*    (2006.01)

(52) U.S. Cl.
  CPC ............... *G02B 26/12* (2013.01); *G02B 5/09* (2013.01); *G02B 26/121* (2013.01)

(58) Field of Classification Search
  CPC ............... G02B 26/121; G02B 26/129; H04N 2201/04755

USPC ......... 359/200.1, 198.1, 200.7, 200.8, 201.2, 359/207.3, 216.1, 855; 347/256, 257, 347/261, 260
See application file for complete search history.

(56) References Cited

U.S. PATENT DOCUMENTS 5,359,460 A  * 10/1994  Urakawa ............... G02B 26/121
                                              359/198.1
5,619,363 A  *  4/1997  Hachisuga ............... G02B 5/09
                                              359/206.1

(Continued)

FOREIGN PATENT DOCUMENTS

JP      61-203721 U    12/1986
JP      63-303316 A    12/1988

(Continued)

*Primary Examiner* — Stephone B Allen
*Assistant Examiner* — Travis Fissel
(74) *Attorney, Agent, or Firm* — Merchant & Gould P.C.

(57) ABSTRACT

A light deflector includes: a polygon mirror made of plastic and having a plurality of reflecting surfaces; a motor including a rotor and configured to rotate the polygon mirror; and a pressing member configured to press the polygon mirror toward the rotor in an axial direction of the motor. The polygon mirror has a first surface having a polygonal shape, and a second surface opposite to the first surface in the axial direction and having a polygonal shape. The second surface faces the rotor. The polygon mirror includes a plurality of first contact portions configured to be in contact with and pressed by the pressing member, and the first contact portions are provided on the first surface at positions equally distant from an axis of the motor between each of vertices of the first surface and the axis of the motor.

17 Claims, 10 Drawing Sheets

(56) References Cited

U.S. PATENT DOCUMENTS

| | | | | |
|---|---|---|---|---|
| 5,650,870 A | * | 7/1997 | Kaino | G02B 5/09 |
| | | | | 359/216.1 |
| 5,903,300 A | * | 5/1999 | Suzuki | G02B 26/121 |
| | | | | 347/261 |
| 6,201,624 B1 | * | 3/2001 | Ozaki | G02B 26/121 |
| | | | | 359/198.1 |
| 6,449,000 B1 | * | 9/2002 | Suzuki | G02B 5/09 |
| | | | | 347/243 |
| 2001/0036001 A1 | * | 11/2001 | Konno | G02B 26/12 |
| | | | | 359/207.8 |
| 2012/0127252 A1 | * | 5/2012 | Lim | G02B 5/09 |
| | | | | 347/118 |

FOREIGN PATENT DOCUMENTS

| | | |
|---|---|---|
| JP | 2-44714 U | 3/1990 |
| JP | 2-262611 A | 10/1990 |
| JP | 3-214116 A | 9/1991 |
| JP | 3-228013 A | 10/1991 |
| JP | 4-63315 A | 2/1992 |
| JP | 5-257077 A | 10/1993 |
| JP | 5-297311 A | 11/1993 |
| JP | 6-43377 A | 2/1994 |
| JP | 6-51226 A | 2/1994 |
| JP | 7-199104 A | 8/1995 |
| JP | 8-118496 A | 5/1996 |
| JP | 2003-322819 A | 11/2003 |

\* cited by examiner

LIGHT DEFLECTOR AND POLYGON MIRROR

CROSS REFERENCE TO RELATED APPLICATIONS

The present application claims priority from Japanese Patent Application Nos. 2014-024040, 2014-024041 and 2014-024042, which were filed on Feb. 12, 2014, the disclosures of which are incorporated herein by reference in their entirety.

TECHNICAL FIELD

An aspect of this disclosure relates to a polygon mirror made of plastic and a light deflector comprising the polygon mirror.

BACKGROUND ART

A known polygon mirror made of plastic and having six reflecting surfaces typically has three projections (first contact portions) on an upper surface thereof at positions corresponding to three vertices selected from the six vertices of the upper surface. The polygon mirror is fastened to a light deflector using a pressing member, by which the projections of the polygon mirror are pressed toward a motor.

The polygon mirror made of plastic would deform when it is pressed by the pressing member. In the above configuration of the polygon mirror, as the amount of deformation varies depending on whether or not the vertex is provided with the projection, each of the reflecting surfaces deforms by a different amount.

In view of the above, it is a first object to provide a polygon mirror which can prevent the reflecting surfaces from deforming by different amounts, and to provide a light deflector comprising such a polygon mirror.

The polygon mirror made of a plastic resin may be manufactured by a known method, in which a plastic resin is injected through a gate provided at a center of the mold.

However, in a case where the polygon mirror has a recessed portion into which a motor for rotating the polygon mirror is inserted, the thickness of the polygon mirror is reduced at a portion corresponding to the recessed portion than at other portions. Therefore, the liquidity of the resin decreases, when molding, at the portion corresponding to the recessed portion with the result that the moldability of the polygon mirror may deteriorate.

In view of the above, it is a second object to provide a polygon mirror which improves moldability.

Generally, a polygon mirror has a plurality of reflecting surfaces, by which a light beam emitted from a light source is reflected toward a scanning optical system when the polygon mirror rotates at high speeds.

The polygon mirror is shaped such that two adjacent reflecting surfaces are directly connected to form a sharp edge. This causes the mold releasing resistance to be increased when the molded product is removed from the mold. As a result, the moldability of the polygon mirror deteriorates.

In view of the above, it is a third object to provide a polygon mirror which improves moldability by reducing the mold releasing resistance.

SUMMARY

According to a first aspect which can achieve the first object, a light deflector comprises: a polygon mirror made of plastic and having a plurality of reflecting surfaces; a motor including a rotor and configured to rotate the polygon mirror; and a pressing member configured to press the polygon mirror toward the rotor in an axial direction of the motor. The polygon mirror has a first surface having a polygonal shape, and a second surface opposite to the first surface in the axial direction and having a polygonal shape. The second surface faces the rotor. Further, the polygon mirror comprises a plurality of first contact portions configured to be in contact with and pressed by the pressing member, and the first contact portions are provided on the first surface at positions equally distant from an axis of the motor between each of vertices of the first surface and the axis of the motor.

Further, according to a first aspect which can achieve the first object, there is provided a polygon mirror made of plastic and having a plurality of reflecting surfaces. The polygon mirror comprises: a first surface having a polygonal shape and intersecting with the plurality of reflecting surfaces; and a plurality of protrusions each provided between each of vertices of the first surface and a center of the first surface and configured to protrude from the first surface. The protrusions are located at positions equally distant from the center of the first surface.

According to a second aspect which can achieve the second object, a polygon mirror made of plastic, comprises: a plurality of reflecting surfaces; a first surface intersecting with the plurality of reflecting surfaces; a second surface intersecting with the plurality of reflecting surfaces and opposite to the first surface; a recessed portion formed at a center area of the second surface and configured to be recessed from the second surface; and a protruding portion protruding from the first surface and located to overlap the recessed portion in a direction orthogonal to the second surface.

According to a third aspect which can achieve the third object, a polygon mirror made of plastic, comprises: a plurality of reflecting surfaces each configured as a flat surface; and a connecting surface configured to connect a first reflecting surface and a second reflecting surface that are two adjacent reflecting surfaces of the plurality of reflecting surfaces. A distance from a connecting position where the first reflecting surface and the connecting surface are connected to a line of intersection between an extension of the first reflecting surface and an extension of the second reflecting surface is greater than a distance from a connecting position where the second reflecting surface and the connecting surface are connected to the line of intersection.

These and other objects and aspects will become apparent from the following description taken in conjunction with the accompanying drawings.

DETAILED DESCRIPTION

Figure 1:
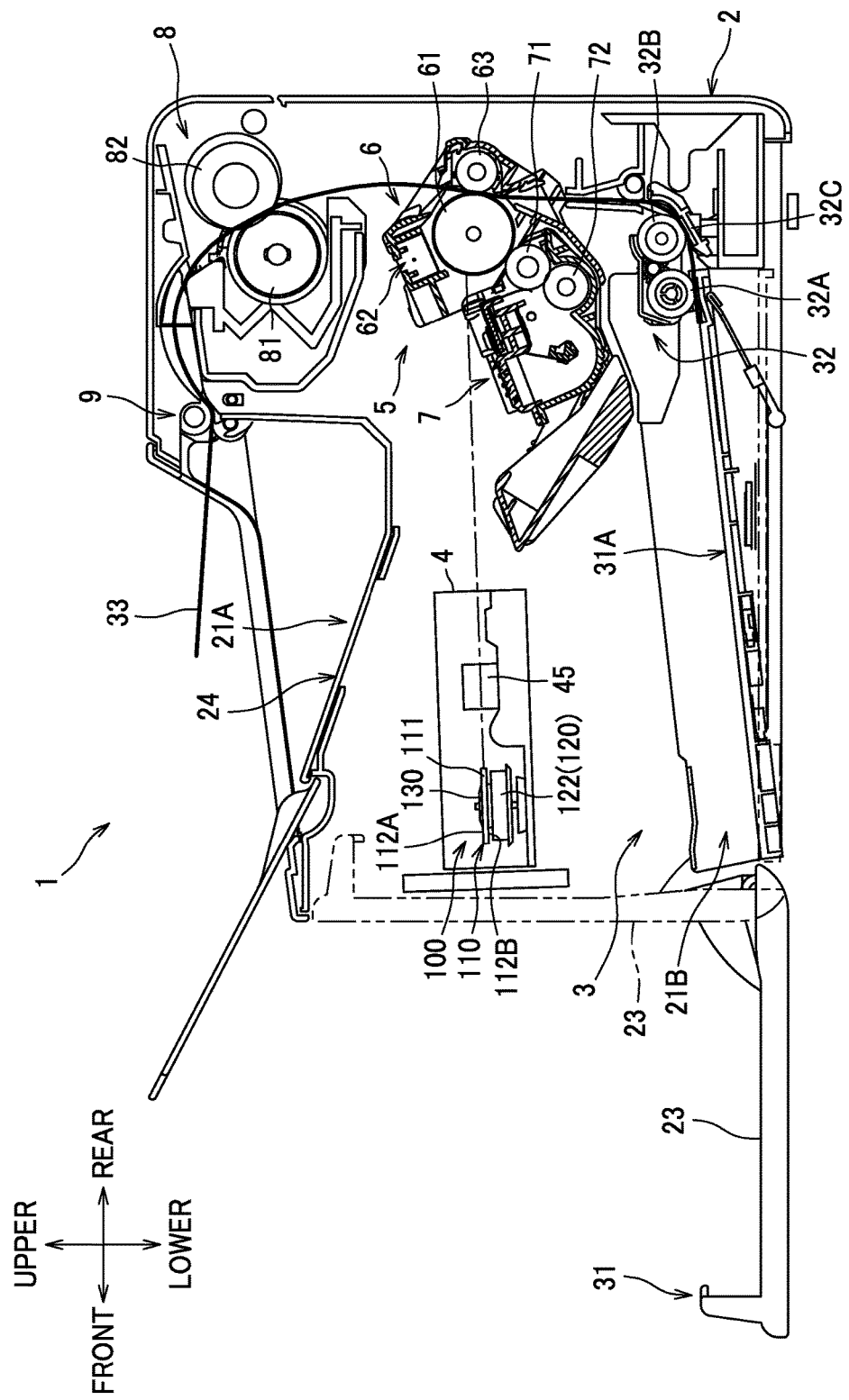
FIG. 1 is a sectional view showing a laser printer.

A detailed description will be given of an illustrative disclosure with reference to the accompanying drawings. In the following description, a general arrangement of a laser printer as an example of an image forming apparatus according to an illustrative disclosure will be described, and thereafter characteristic features will be described in detail.

In the following description, the direction is designated as from the viewpoint of a user who is using (operating) the laser printer. To be more specific, in FIG. 1, the left-hand side of the drawing sheet corresponds to the "front" side of the laser printer, the right-hand side of the drawing sheet corresponds to the "rear" side of the laser printer, the front side of the drawing sheet corresponds to the "right" side of the laser printer, and the back side of the drawing sheet corresponds to the "left" side of the laser printer. Similarly, the direction extending from top to bottom of the drawing sheet corresponds to the "vertical" or "upper-lower" (upward/downward, up/down, upper/lower or top/bottom) direction of the laser printer.

As seen in FIG. 1, a laser printer 1 mainly includes a main body 2, a feeder unit 3, a scanner 4 as an example of an optical scanner, a process cartridge 5, and a fixing device 8.

The main body 2 is provided with a front cover 23 pivotally supported by the main body 2. When the front cover 23 is swung forward into a lying back position to open an insertion slot 21B, a stack of sheets 33 can be inserted into the main body 2 through the insertion slot 21B.

The feeder unit 3 is located in a lower portion of the main body 2. The feeder unit 3 mainly includes a sheet feed tray 31 for receiving sheets 33, and a sheet feed mechanism 32 for feeding a sheet 33 from the sheet feed tray 31.

The sheet feed tray 31 includes a sheet receiving plate 31A disposed at the lower portion of the main body 2 and the above-described front cover 23. The sheet feed mechanism 32 mainly includes a sheet feed roller 32A, a separation roller 32B, and a separation pad 32C.

In the feeder unit 3, the sheet feed roller 32A feeds sheets 33 from the stack of sheets 33 placed on the sheet feed tray 31, and the sheets 33 are separated one from the other when passing through between the separation roller 32B and the separation pad 32C and fed to the process cartridge 5.

The scanner 4 is located in a front portion of the main body 2 and configured to scan the surface of a photoconductor drum 61 to be described later with a laser beam. Details of the scanner 4 will be described later.

The process cartridge 5 is located in a rear portion of the main body 2 at a position around a center portion in the upper-lower direction and above the sheet feed mechanism 32. The process cartridge 5 is detachably attached to the main body 2. When a top cover 24 pivotally supported by the main body 2 is swung open to expose an opening 21A, the process cartridge 5 is detachable from the main body 2 through the opening 21A in a frontward and upward direction. The process cartridge 5 includes a drum unit 6, and a development cartridge 7 as an example of a development device.

The drum unit 6 includes a photoconductor drum 61 as an example of a photoconductor, a charger 62, and a transfer roller 63. The development cartridge 7 includes a development roller 71 and a supply roller 72.

In the development cartridge 7, toner stored in a toner storage chamber is supplied to the development roller 71 by the supply roller 72, during which the toner is charged positively and carried on the development roller 71. In the drum unit 6, the surface of the rotating photoconductor drum 61 is uniformly charged by the charger 62 and then exposed to a rapidly sweeping laser beam from the scanner 4. Accordingly, the electric potential of the exposed area lowers, so that an electrostatic latent image associated with image data is formed on the surface of the photoconductor drum 61.

The toner in the development cartridge 7 is then supplied to the electrostatic latent image, so that a toner image (developer image) is formed on the surface of the photoconductor drum 61. Thereafter, while a sheet 33 is conveyed through between the photoconductor drum 61 and the transfer roller 63, the toner image carried on the surface of the photoconductor drum 61 is transferred onto the sheet 33.

The fixing device 8 is located in a rear upper portion of the main body 2 at a position above the process cartridge 5. The fixing device 8 mainly includes a heating roller 81 and a pressure roller 82.

In the fixing device 8 configured as described above, the toner transferred onto the sheet 33 is thermally fixed while the sheet 33 passes through between the heating roller 81 and the pressure roller 82. The sheet 33 with the toner thermally fixed thereon by the fixing device 8 is conveyed to a sheet ejection roller 9 which is disposed downstream from the fixing device 8, and then ejected out from the sheet ejection roller 9 onto the top cover 24.

Figure 2:
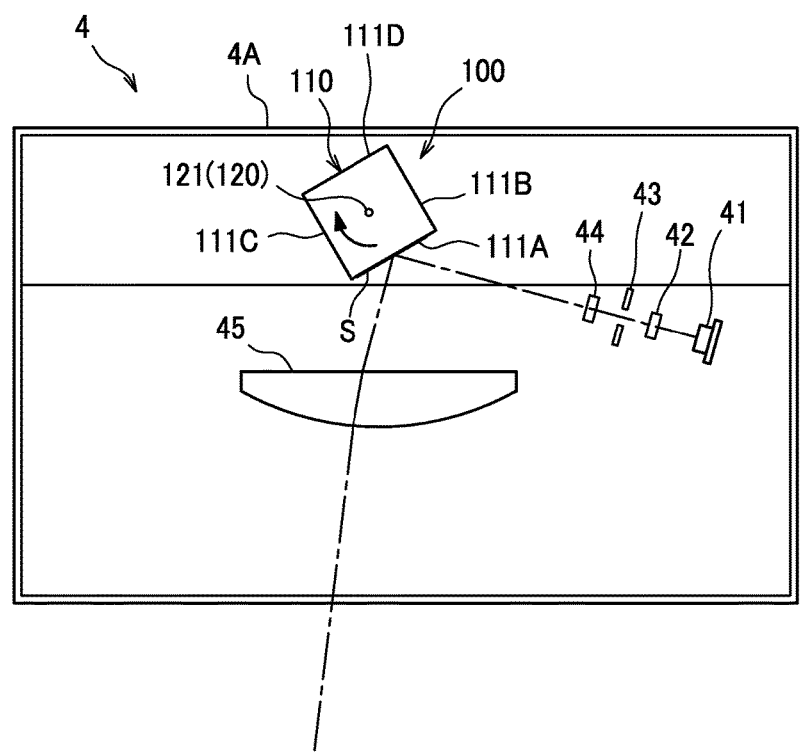
FIG. 2 is a top view of a scanner.

As seen in FIGS. 1 and 2, the scanner 4 includes a semiconductor laser 41, a coupling lens 42, an aperture stop 43, a cylindrical lens 44, a light deflector 100, a scanning lens 45 as an example of a scanning optical system, and other parts. It is to be noted that the semiconductor laser 41 and the coupling lens 42 function as a light source. These constituent elements are supported on a casing 40A. As shown by the chain lines in the figures, a laser beam emitted from the semiconductor laser 41 passes through the coupling lens 42, the aperture stop 43, the cylindrical lens 44, the light deflector 100, and the scanning lens 45 in this order, and then focuses on the photoconductor drum 61.

As seen in FIG. 2, the semiconductor laser 41 emits a diverging laser light. Light-emitting elements of the semiconductor laser 41 are controlled by a controller (not shown) to be turned on and off in accordance with the image to be formed with the laser beam on the surface of the photoconductor drum 61.

The coupling lens 42 is a lens configured to convert a laser light emitted from the semiconductor laser 41 into a light beam. The aperture stop 43 defines the diameter of the beam of light converted by the coupling lens 42. The cylindrical lens 44 is a lens configured to bring the laser beam having passed through the aperture stop 43 into focus on a polygon mirror 110 to be described later in the sub-scanning direction (i.e., direction orthogonal to the drawing sheet of FIG. 2).

As seen in FIG. 1, the light deflector 100 includes a polygon mirror 110, a motor 120, and a pressing member 130. Details of the light deflector will be described later.

As seen in FIG. 2, the scanning lens 45 is a lens configured to bring the laser beam having been reflected and thus deflected by the polygon mirror 110 into focus on the surface of the photoconductor drum 61. The scanning lens 45 has f-theta characteristics such that the laser beam deflected at a constant angular velocity by the polygon mirror 110 is converted into a laser beam that scans the surface of the photoconductor drum 61 at a constant linear velocity.

Details of the light deflector 100 will be described below.

The polygon mirror 110 is made of plastic (e.g., made by injection molding). The polygon mirror 110 is configured to spin at a constant speed around a rotary shaft 121 of the motor 120, so that the laser beam having passed through the cylindrical lens 44 is deflected in the main scanning direction. The polygon mirror 110 is shaped as a square column with a substantially square bottom, and reflecting films made of aluminum or the like are evaporated onto surfaces of the polygon mirror 110.

Figure 3A:
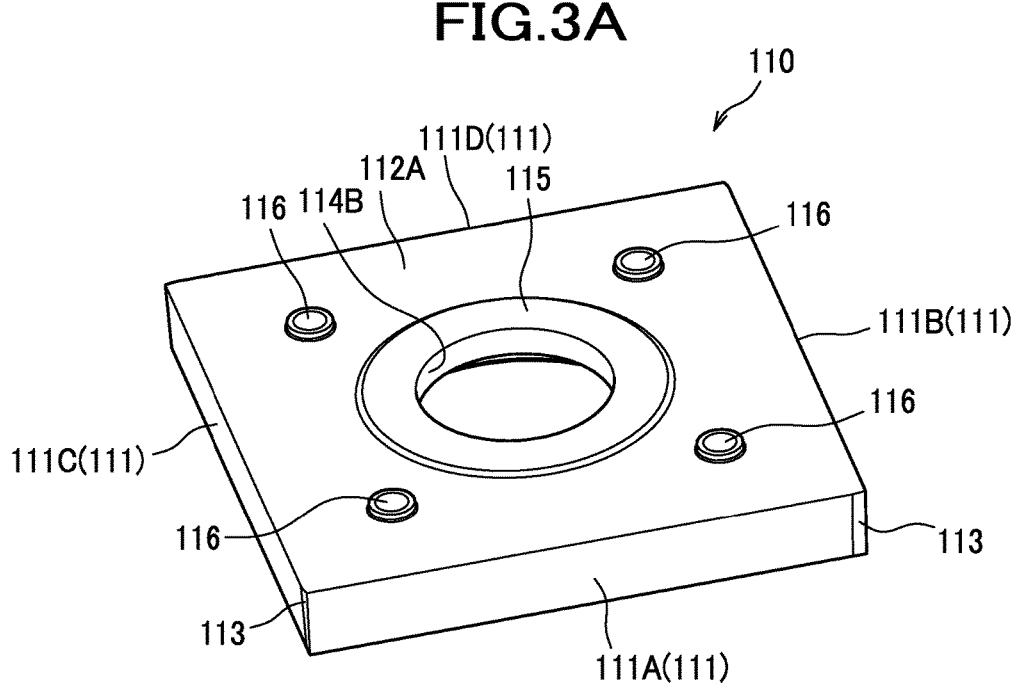
FIG. 3A is a perspective view of a polygon mirror as viewed from a first surface side.
Figure 3B:
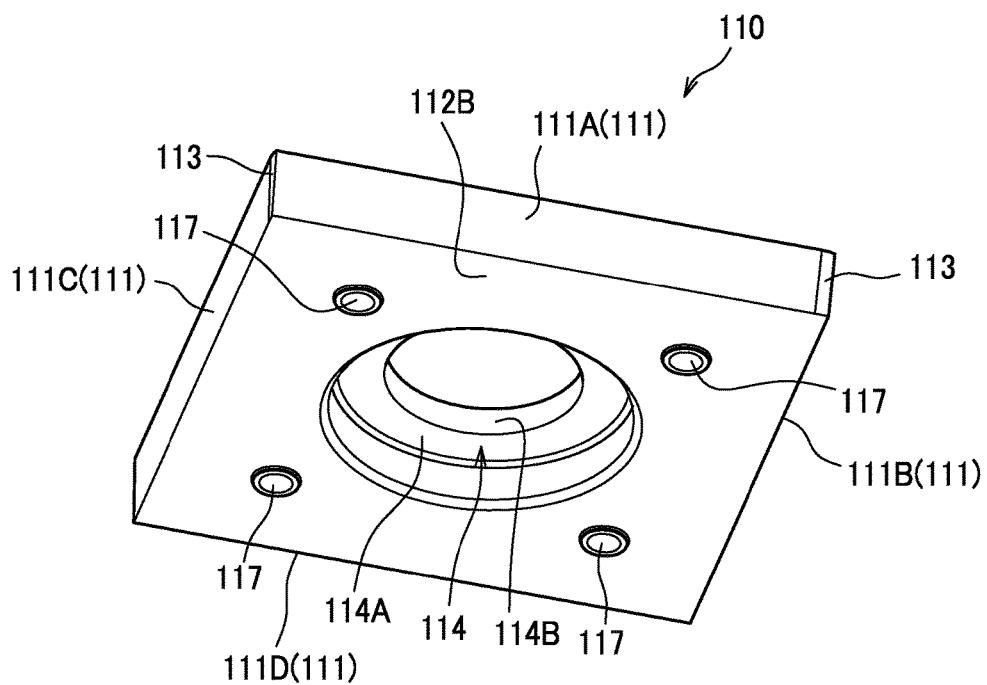
FIG. 3B is a perspective view of the polygon mirror as viewed from a second surface side.

As seen in FIG. 1 and FIGS. 3A and 3B, the polygon mirror 110 has four (a plurality of) reflecting surfaces 111 which constitute side surfaces, a first surface 112A which constitutes a top surface remote from (opposite to a second surface 112B to be described later and located at one side) a rotor 122 of the motor 120 to be described later in an axial direction of a rotary shaft 121 of the motor 120, a second surface 112B which constitutes a bottom surface opposite to the first surface 112A in the axial direction of the rotary shaft 121 and facing the rotor 122 of the motor 120 (intersecting with the four reflecting surfaces 111 and located at the other side), and four connecting surfaces 113 which together with the four reflecting surfaces 111 constitute the side surfaces. In the following descriptions, the axial direction of the rotary shaft 121 will be simply referred to as the "axial direction."

The four reflecting surfaces 111 are configured as flat surfaces. As shown in an exaggerated manner in FIG. 5B, each of the four reflecting surfaces 111 is tilted such that the shortest distance L1 from an axis of rotation of the polygon mirror 110 (axis of rotation P of the rotary shaft 121) to a portion of the reflecting surface 111 closer to the first surface 112A is greater than the shortest distance L2 from the axis of rotation of the polygon mirror 110 to a portion of the reflecting surface 111 closer to the second surface 112B (i.e., L1>L2). It is to be noted that the term "flat surface(s)" indicates not only a completely flat surface but also a protrusive surface or a recessed surface having a sufficiently large radius of curvature as well as a flat surface with very little deformation.

Figure 4A:
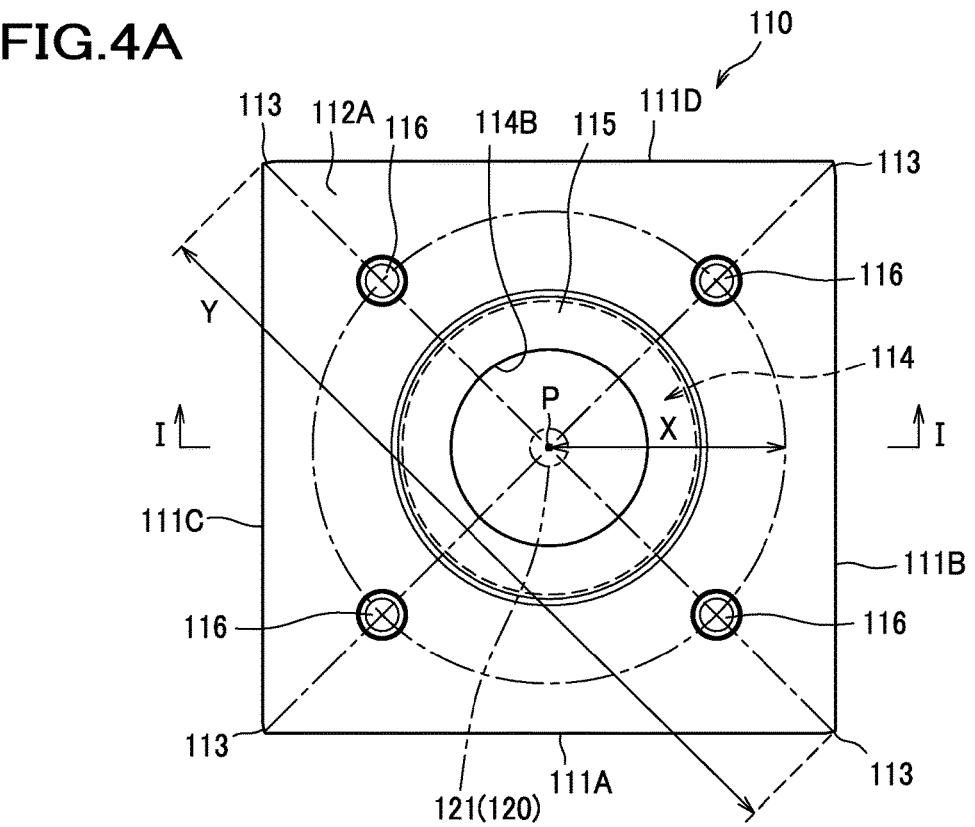
FIG. 4A is a top view of the polygon mirror as viewed from the first surface side.

As seen in FIG. 4A, the four reflecting surfaces 111 include a first reflecting surface 111A, a second reflecting surface 111B adjacent to the first reflecting surface 111A, a third reflecting surface 111C opposite to the second reflecting surface 111B and adjacent to the first reflecting surface 111A, and a fourth reflecting surface 111D opposite to the first reflecting surface 111A and adjacent to the second and third reflecting surfaces 111B and 111C.

Figure 4B:
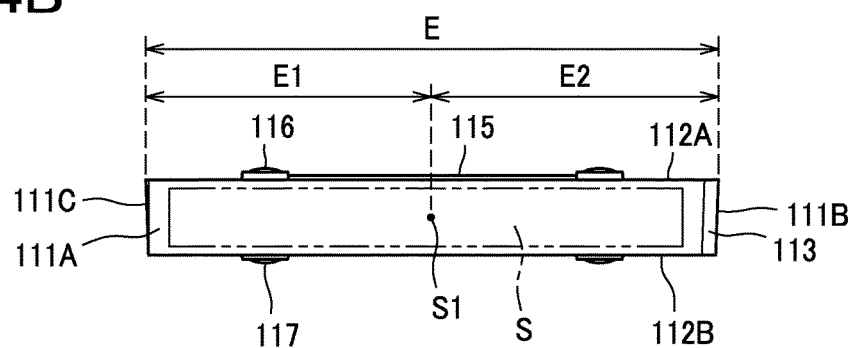
FIG. 4B is a side view of the polygon mirror.

The four reflecting surfaces 111 are arranged such that when starting from the first reflecting surface 111A, the first reflecting surface 111A, the second reflecting surface 111B, the fourth reflecting surface 111D, and the third reflecting surface 111C are adjacently disposed in this order in the anticlockwise direction of the figure. In other words, as seen in FIG. 2, each of the reflecting surfaces 111 are arranged such that when the first reflecting surface 111A reflects a light beam, the second reflecting surface 111B is located farther from the scanning lens 45 than the third reflecting surface 111C is. At this position, a usable area S which is a range of the reflecting surface 111 used for reflecting a light beam emitted from the semiconductor laser 41 is shifted on the first reflecting surface 111A to a position closer to the scanning lens 45. Namely, as seen in FIG. 4B, the usable area S of the first reflecting surface 111A is disposed such that the center S1 of the usable area S is arranged closer to the third reflecting surface 111C than to the second reflecting surface 111B. In other words, the distance E1 from the center S1 of the usable area S of the first reflecting surface 111A to the third reflecting surface 111C is smaller than the distance E2 from the center S1 of this usable area S to the second reflecting surface 111B.

As seen in FIG. 4A, the connecting surfaces 113 are surfaces for connecting the four reflecting surfaces 111; a total of four connecting surfaces 113 are provided, one for each two adjacent reflecting surfaces 111. In the following descriptions, detailed description will only be given of the connecting surface 113 connecting the first reflecting surface 111A and the second reflecting surface 111B, and duplicated descriptions of the other similar connecting surfaces 113 will be omitted.

Figure 6:
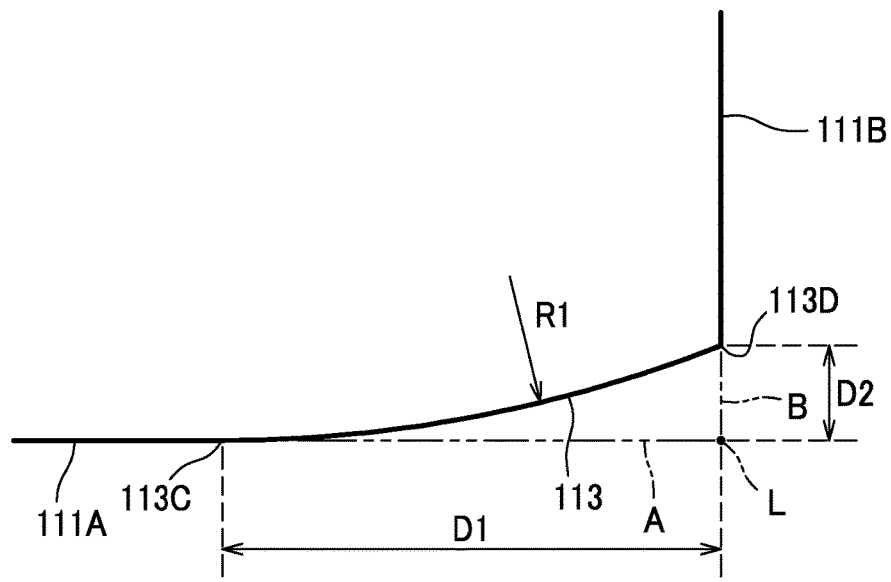
FIG. 6 is an enlarged view showing the connecting surface of FIG. 4A.

As seen in FIG. 6, the connecting surface 113 includes a cylindrical surface having a radius of curvature R1, namely, an arc-shaped cross-section.

Further, the distance D1 from a connecting position 113C where the first reflecting surface 111A and the connecting surface 113 are connected to the line of intersection L between an extension A of the first reflecting surface 111A and an extension B of the second reflecting surface 111B is greater than the distance D2 from a connecting position 113D where the second reflecting surface 111B and the connecting surface 113 are connected to the line of intersection L. With this configuration, the connecting surface 113 can be shaped as a gently curved surface. The distance D1 is preferably equal to or greater than 150% of the distance D2, and more preferably, equal to or greater than 300% of the distance D2. Further, it is preferable that the distance D1 is equal to or smaller than 0.5% of the distance E between the second reflecting surface 111B and the third reflecting surface 111C (see FIG. 4B).

Figure 5A:
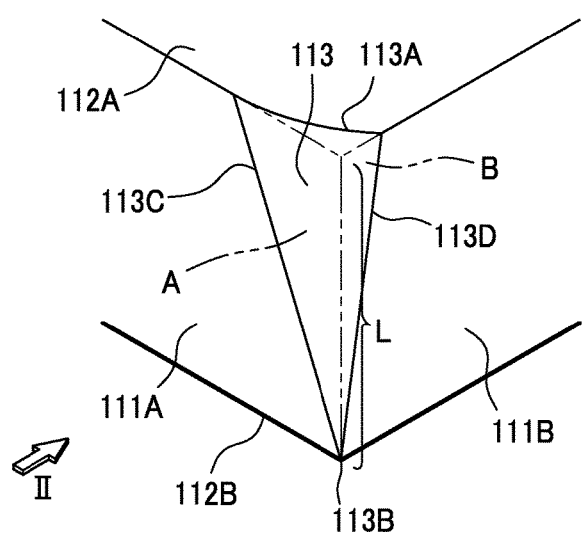
FIG. 5A is an enlarged perspective view showing a connecting surface of the polygon mirror.
Figure 5B:
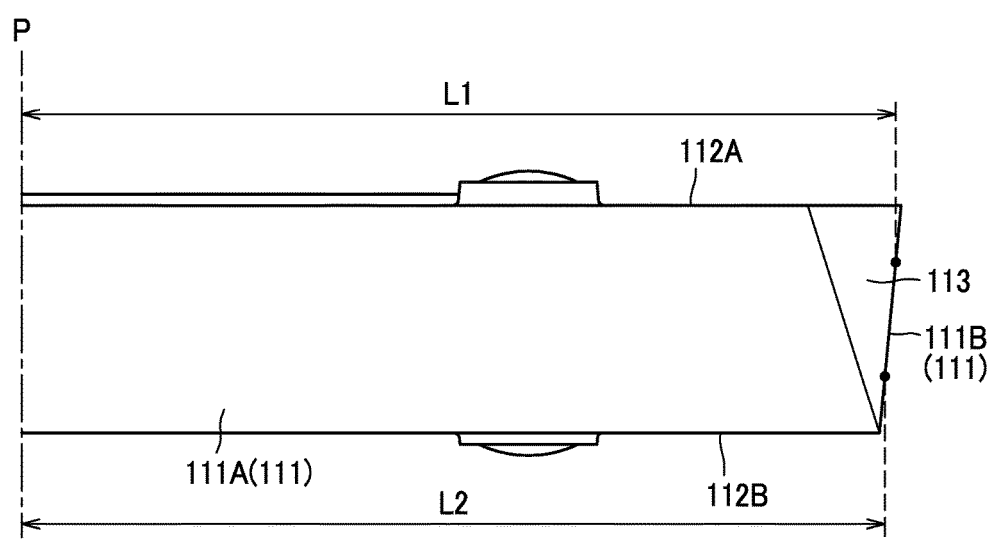
FIG. 5B is a view of the connecting surface as viewed from the direction indicated by arrow II of FIG. 5A.

As seen in FIG. 5A, the connecting surface 113 connects the first reflecting surface 111A and the second reflecting surface 111B as well as the first surface 112A and the second surface 112B. The connecting surface 113 has a first connecting portion 113A connected to the first surface 112A and a second connecting portion 113B connected to the second surface 112B, and the first connecting portion 113A is longer than the second connecting portion 113B. In other words, the connecting surface 113 is wider as the distance from the second surface 112B toward the first surface 112A increases.

Figure 4C:
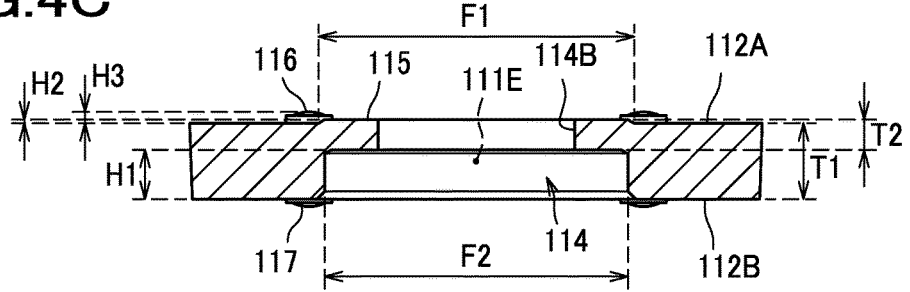
FIG. 4C is a sectional view taken along the line I-I of FIG. 4A.

Further, as seen in FIGS. 4A, 4B and 4C, the polygon mirror 110 includes a recessed portion 114 configured to be recessed from the second surface 112B, a protruding portion 115 configured to protrude from the first surface 112A, first protrusions 116 as an example of first contact portions (protrusions) provided outside the protruding portion 115 and protruding from the first surface 112A, and second protrusions 117 as an example of second contact portions provided outside the recessed portion 114 and protruding from the second surface 112B.

The recessed portion 114 is configured to receive the rotor 122 of the motor 120 and located at the center area of the second surface 112B. The recessed portion 114 has a circular contour as viewed from the axial direction, and a through-hole 114B (penetrating in the axial direction) is formed in a bottom 114A of the recessed portion 114 at the center of the bottom 114A. The rotary shaft 121 of the motor 120 is disposed to pass through the through-hole 114B.

The protruding portion 115 is located at a position corresponding to the recessed portion 114 of the first surface 112A, namely, at a position overlapping the recessed portion 114 as viewed from the axial direction (i.e., direction orthogonal to the second surface 112B). With this configuration, as seen in a section passing through the rotary shaft 121 (cross-section shown in FIG. 4C), the thickness of the polygon mirror 110 in the axial direction varies less at a portion corresponding to the recessed portion 114 and at other portions.

It is preferable that the thickness T2 from the bottom 114A of the recessed portion 114 to the upper end of the protruding portion 115 as shown in FIG. 4C is equal to or greater than 30% of the thickness T1 of the polygon mirror 110. This can improve the liquidity of the plastic when molding.

As viewed from the axial direction, the protruding portion 115 has a circular contour, and the diameter F1 of the circular contour (i.e., the maximum diameter of the protruding portion 115 at the lower end thereof as shown in FIG. 4C) is greater than the diameter F2 of the circular contour of the recessed portion 114. With this configuration, the protruding portion 115 covers the entire region of the recessed portion 114. Accordingly, the liquidity of the plastic when molding is highly satisfactory because the thickness of the polygon mirror 100 varies less in the section passing through the rotary shaft 121. The diameter F1 of the circular contour of the protruding portion 115 may be the same as the diameter F2 of the circular contour of the recessed portion 114. Further, it is preferable that the diameter F2 of the circular contour of the recessed portion 114 is equal to or less than 35% of the length Y of the diagonal line of the polygon mirror 110.

As seen in FIG. 4A, four first protruding portions 116 are provided to surround the protruding portion 115; each of the first protruding portions 116 is configured to be in contact with and pressed by the pressing member 130. Each first protruding portion 116 has a circular contour as viewed from the axial direction. Further, as seen in FIG. 4B, each first protruding portion 116 has a spherical surface.

The first protruding portions 116 are provided on the first surface 112A at positions equally distant from the axis of rotation P of the rotary shaft 121 of the motor 120 (i.e., center of the first surface 112A) between each of vertices of the first surface 112A and the axis of rotation P of the rotary shaft 121 (i.e., on lines connecting each of vertices of the first surface 112A and the axis of rotation P of the rotary shaft 121); the distances X from the axis of rotation P of the rotary shaft 121 are the same at all the first protruding portions 116. In other words, the first protruding portions 116 are arranged to maintain the same positional relations with respect to the closest vertices. Further, it is preferable that the distance X from the axis of rotation P of the rotary shaft 121 to each of the first protruding portions 116 is in the range of 19-38% of the length Y of the diagonal line of the polygon mirror 110.

It is preferable that the diameter F2 of the circular contour of the recessed portion 114 satisfies F2<2X, and that the diameter F1 of the circular contour of the protruding portion 115 satisfies F1<2X. Further, in the case where the recessed portion 114 is located inward of the inner edge of the first protruding portion 116 in the configuration shown in FIG. 4C, the distance X from the axis of rotation P of the rotary shaft 121 to each of the first protruding portions 116 may be in the range of 10-38% of the length Y of the diagonal line of the polygon mirror 110.

Figure 7:
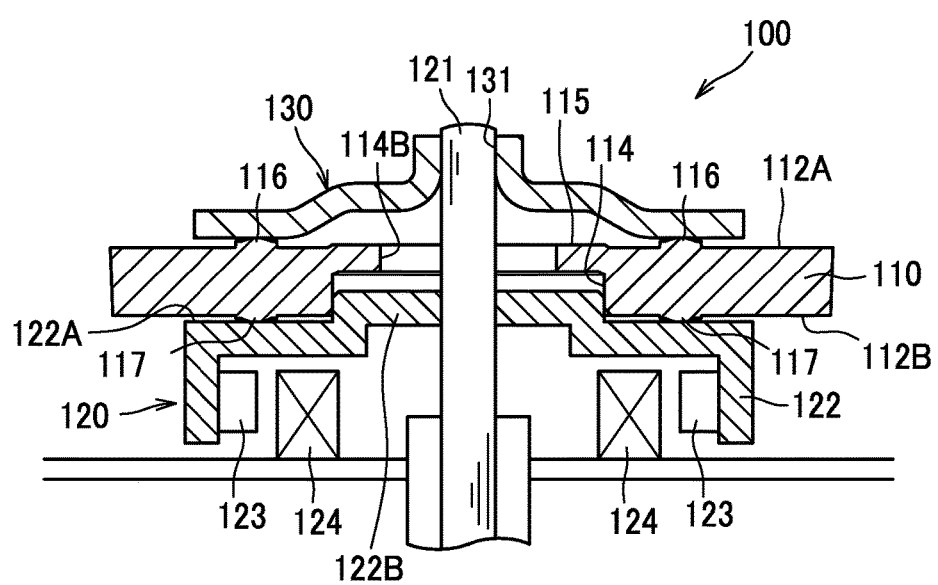
FIG. 7 is a sectional view of a light deflector taken along a diagonal line of the first surface of the polygon mirror.

The second protruding portions 117 are configured to be in contact with the rotor 122 of the motor 120, and four second protruding portions 117 are provided at positions corresponding to the first protruding portions 116 (see FIGS. 3B and 7). In other words, the second protruding portions 117 are arranged to overlap the first protruding portions 116 as viewed from the axial direction. Each second protruding portion 117 has a circular contour as viewed from the axial direction. Further, each second protruding portion 117 has a spherical surface. All the second protruding portions 117 and the first protruding portions 116 may have the same shape. Alternatively, each second protruding portion 117 may have a flat surface and the entire shape thereof may be a circular cylinder.

As seen in FIG. 7, the motor 120 is configured to rotate the polygon mirror 110. The motor 120 includes the rotary shaft 121 and the rotor 122 to which the rotary shaft 121 is fixed.

The motor 120 includes a magnet 123 fixed to the rotor 122, and a stator side coil 124 provided opposite to the magnet 123. The motor 120 is configured such that when the coil 124 is energized, the magnet 123 receives a force to rotate the rotor 122.

The rotor 122 further includes a rotor surface 122A which faces toward the polygon mirror 110, and a rotor-side protruding portion 122B protruding from the rotor surface 122A and coaxial with the rotary shaft 121. The outer peripheral surface of the rotor-side protruding portion 122B is fitted into the recessed portion 114, so that the polygon mirror 110 is aligned with the motor 120.

It is to be noted that as shown in FIG. 4C, the length (height) of recess H1 by which the above-described recessed portion 114 is recessed from the second surface 112B is greater than the length (height) of protrusion H2 by which the protruding portion 115 protrudes from the first surface 112A. This can provide a sufficient height of recess for the rotor-side protruding portion 122B to be fitted into the recessed portion 114. It is preferable that the height of recess H1 is in the range of 20-80% of the thickness T1 of the polygon mirror 110. It is further preferable that the height of recess H1 is in the range of 60-70% of the thickness T1 of the polygon mirror 110 (not less than half the thickness T1) and that the axial center portion 111E of each of the reflecting surfaces 111 and the recessed portion 114 overlap each other as viewed from the direction orthogonal to the axial direction. With this configuration, the reflecting surfaces 111 can be accurately positioned with respect to the rotor 122.

Further, as seen in FIG. 7, the rotor 122 is configured such that when the rotor-side protruding portion 122B is fitted into the recessed portion 114, the rotor surface 122A comes into contact with the second protruding portions 117. In other words, the rotor surface 122A contacts the polygon mirror 110 only at the second protruding portions 117. Namely, except for the second protruding portions 117, the polygon mirror 110 is spaced apart from the rotor surface 122A.

The pressing member 130 has springiness and is located to cover the first surface 112A of the polygon mirror 110. The pressing member 130 has a center portion that protrudes upward in the figure, and contacts the first protruding portions 116 at right and left end portions thereof as shown in FIG. 7. A hole 131 is formed in the pressing member 130 at the center portion thereof; the hole 131 has a size to permit the rotary shaft 121 of the motor 120 that has been inserted through the through-hole 114B to be press fitted into the hole 131. When the pressing member 130 is press fitted onto the rotary shaft 121 through the hole 131, the pressing member 130 deforms between the first protruding portions 116 and the hole 131 to thereby generate an urging force that acts in the downward direction in FIG. 7. The pressing member 130 presses the polygon mirror 110 by the portions corresponding to the first protruding portions 116 in the axial direction toward the rotor 122 of the motor 120.

It is to be noted that as shown in FIG. 4C, the length (height) of protrusion H3 by which the above-described first protruding portions 116 protrude from the first surface 112A is greater than the length (height) of protrusion H2 by which the protruding portion 115 protrudes from the first surface 112A. Accordingly, the polygon mirror 110 is pressed by the pressing member 130 only at the first protruding portions 116.

Description will now be given of the manufacturing method for the polygon mirror 110.

Figure 8A:
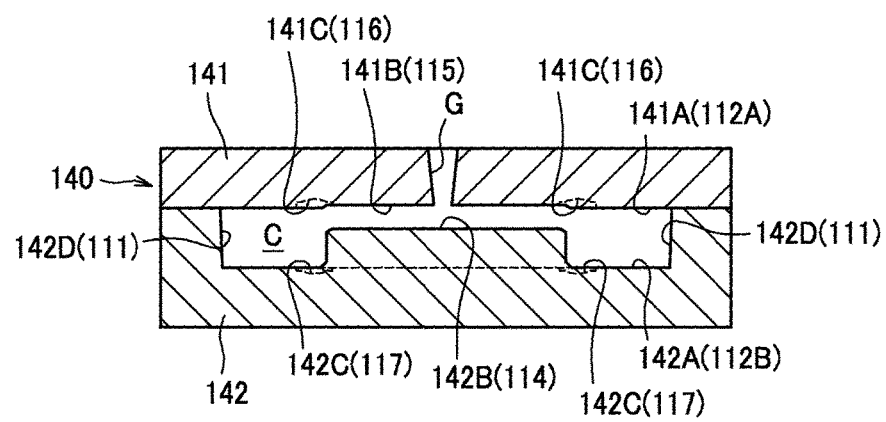
FIG. 8A is a sectional view of a mold for manufacturing the polygon mirror.

In this disclosure, a mold 140 shown in FIG. 8A is used for manufacturing the polygon mirror 110. The mold 140 has a cavity C corresponding to the contour of the polygon mirror 110.

To be more specific, the mold 140 consists of a first mold 141 and a second mold 142. The first mold 141 includes a first surface molding surface 141A corresponding to the first surface 112A, a protruding portion molding surface 141B recessed from the first surface molding surface 141A and corresponding to the protruding portion 115, and first protruding portion molding surfaces 141C recessed from the first surface molding surface 141A and corresponding to the first protruding portions 116. Provided at the center of the protruding portion molding surface 141B, that is, the position corresponding to the center of the protruding portion 115 is a gate G through which the plastic material is injected into the mold 140.

The second mold 142 includes a second surface molding surface 142A corresponding to the second surface 112B, a recessed portion molding surface 142B protruding from the second surface molding surface 142A and corresponding to the recessed portion 114, second protruding portion molding surfaces 142C recessed from the second surface molding surface 142A and corresponding to the second protruding portions 117, and reflecting surface molding surfaces 142D corresponding to the reflecting surfaces 111.

Figure 8B:
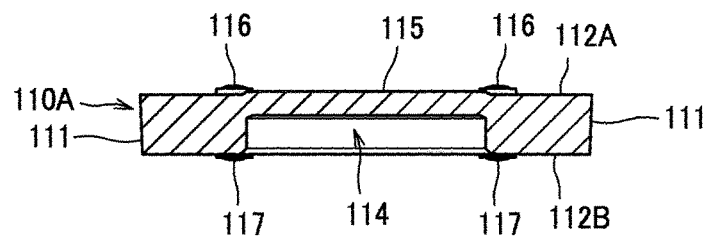
FIG. 8B is a sectional view of a molded product removed from the mold.

After preparing this mold 140 (preparation process), molding is carried out by injecting the plastic material into the mold 140 through the gate G (molding process). After the molding, a molded product 110A (see FIG. 8B) is removed from the mold 140 (second mold 142), and a through-hole 114B is formed in a position corresponding to the gate G (perforating process). It is preferable that a drill is used for processing in the perforating process. The perforating process may be omitted in a manufacturing method in which a molded product 110A with a through-hole 114B is manufactured in the molding process or in a manufacturing method for a polygon mirror 110 without a through-hole 114B.

After that, reflecting films made of aluminum or the like are evaporated onto surfaces of the molded product 110A (evaporation process) to thereby produce a polygon mirror 110 (see FIG. 4C).

According to the above disclosure, the following advantageous effects can be achieved.

The polygon mirror 110 is pressed downward by the pressing member 130 toward the motor 120. The pressing member 130 presses the polygon mirror 110 at the first protruding portions 116. In the case of the polygon mirror 110 made of plastic, each of the reflecting surfaces 111 deform when the polygon mirror 110 is pressed by the pressing member 130. In this disclosure, since the first protruding portions 116 are arranged to maintain the same positional relations with respect to the closest vertices, the pressure received from the pressing member 130 is constant at all the first protruding portions 116. Further, since the first protruding portions 116 are arranged symmetrically with respect to the center 111E of each of the reflecting surfaces 111, it is possible to prevent the reflecting surfaces 111 from deforming by different amounts, so that adverse effects due to the deformation can be decreased.

Further, since the polygon mirror 110 is pressed only at the first pressing portions 116, the contacting positions between the first protruding portions 116 and the pressing member 130 can be accurately set.

Since contours of the first protruding portions 116 and the second protruding portions 117 are circular, the molded product 110A can be easily removed from the mold 140 after molding.

Since each of the first protruding portions 116 has a spherical surface, the pressing member 130 contacts the first protruding portions 116 at the apex of each first protruding portion 116. Therefore, the contacting positions between the first protruding portions 116 and the pressing member 130 can be accurately set.

Since the second protruding portions 117 overlap the first protruding portions 116 as viewed from the axial direction, it is possible to prevent a force deforming the polygon mirror 110 from arising when the pressing force exerted from the pressing member 130 is transmitted from the first protruding portions 116 to the second protruding portions 117.

Since the rotor surface 122A contacts the polygon mirror 110 only at the second protruding portions 117, heat from the rotor 122 is less likely to be transmitted to the polygon mirror 110.

Since the connecting surface 113 is shaped as a gently curved surface, the mold releasing resistance upon releasing the molded product 110A from the mold 140 (second mold 142) after molding is decreased, so that the moldability of the polygon mirror 110 can be improved.

Further, since the thickness of the polygon mirror 110 varies less at a portion corresponding to the recessed portion 114 and at other portions, the liquidity of the plastic material during molding is improved and therefore the moldability of the polygon mirror 110 can be improved.

As the thickness of the polygon mirror 110 is smaller at the portion corresponding to the recessed portion 114 than at the other portions, the liquidity of the plastic material decreases during the molding. As a result, there may be a possibility that the moldability of the polygon mirror 110 deteriorates.

In this disclosure, however, the thickness of the polygon mirror 110 varies less in the section passing through the rotary shaft 121 because of the presence of the protruding portion 115. This can improve the liquidity of the plastic material during the molding as compared to a polygon mirror without a protruding portion. Accordingly, the moldability of the polygon mirror 110 can be improved.

Since contours of the recessed portion 114 and the protruding portion 115 are circular, the liquidity of the plastic material during the molding can be improved as compared to a polygon mirror having a non-circular contoured recessed portion and a non-circular contoured protruding portion. This further allows the molded product 110A to be easily removed from the mold 140 after the molding.

If the diameter of the circular contour of the protruding portion is smaller than the diameter of the circular contour of the recessed portion, a less thickened portion is formed in the recessed portion around the joint line by which the portion of the recessed portion corresponding to the protruding portion and the portion of the recessed portion not corresponding to the protruding portion are joined. This may cause the liquidity of the plastic material to decrease during the molding. In this disclosure, however, since this less thickened portion is not formed, it is possible to improve the liquidity of the plastic material during the molding.

Since the polygon mirror 110 is pressed by the pressing member 130 only at the first protruding portions 116, a pressure from the pressing member 130 is not likely to be transmitted to the protruding portion 115. This can prevent a deformation of the protruding portion 115.

Since a sufficient length (height) of recess by which the rotor-side protruding portion 122B is fitted into the recessed portion 114 is provided, the polygon mirror 110 is less likely to be shifted in a direction orthogonal to the axial direction. Therefore, positioning of the polygon mirror 110 in this direction can be easily performed. Further, since the sufficient length (height) of recess in the recessed portion 114 is provided, the volume of the molded product 110A can be reduced to thereby save the cost.

Further, in this disclosure, since the through-hole 114B is formed after the molded product 110A made by injecting the plastic material into the mold 140 is removed from the mold 140, molding can be performed while retaining the thickness at the portion of the molded product 110A corresponding to the through-hole 114B. This can improve the liquidity of the plastic material during the molding, so that the moldability of the polygon mirror 110 can be improved.

Further, since the through-hole 114B is formed using a drill, the through-hole 114B can be perforated by a simple method.

If the polygon mirror is shaped such that the first reflecting surface 111A and the second reflecting surface 111B are directly connected to form a sharp edge, the mold releasing resistance upon releasing the molded product 110A from the mold 140 increases, with the result that the moldability may deteriorate.

In this disclosure, however, since the connecting surface 113 is shaped as a gently curved surface, the mold releasing resistance upon releasing the molded product 110A from the mold 140 after the molding can be decreased. Therefore, the moldability of the polygon mirror 110 can be improved.

Since the connecting surface 113 becomes wider as the distance from the second surface 112B toward the first surface 112A increases, the mold releasing resistance upon releasing the molded product 110A from the second mold 142 decreases. Therefore, the molded product 110A can be easily removed from the second mold 142.

Since each of the reflecting surfaces 111 is tilted such that the shortest distance L1 from the axis of rotation of the polygon mirror 110 (i.e., the axis of rotation P of the rotary shaft 121) to a portion of the reflecting surface 111 closer to the first surface 112A is greater than the shortest distance L2 from the axis of rotation of the polygon mirror 110 to a portion of the reflecting surface 111 closer to the second surface 112B, it is possible to make a draft angle on each of the reflecting surfaces 111. Therefore, the molded product 110A can be smoothly removed from the second mold 142.

Further, in this disclosure, the usable area S of the first reflecting surface 111A is located closer to the third reflecting surface 111C, namely, shifted away from the connecting surface 113 between the first reflecting surface 111A and the second reflecting surface 111B. This can prevent the connecting surface 113 and the usable area S from overlapping each other. Accordingly, while retaining the required size of the usable area S, the range of the distance D1 as shown in FIG. 6, that is, the area of the connecting surface 113 can be widened, and the scanning angle for scanning the light beam can be enlarged.

Although an illustrative disclosure have been described in detail, the present invention is not limited to this specific disclosure. It is to be understood that various changes and modifications, such as those described below, may be made without departing from the scope of the appended claims. In the following descriptions, parts similar to those previously described in the above disclosure are denoted by the same reference numerals and detailed description thereof will be omitted.

Figure 9A:
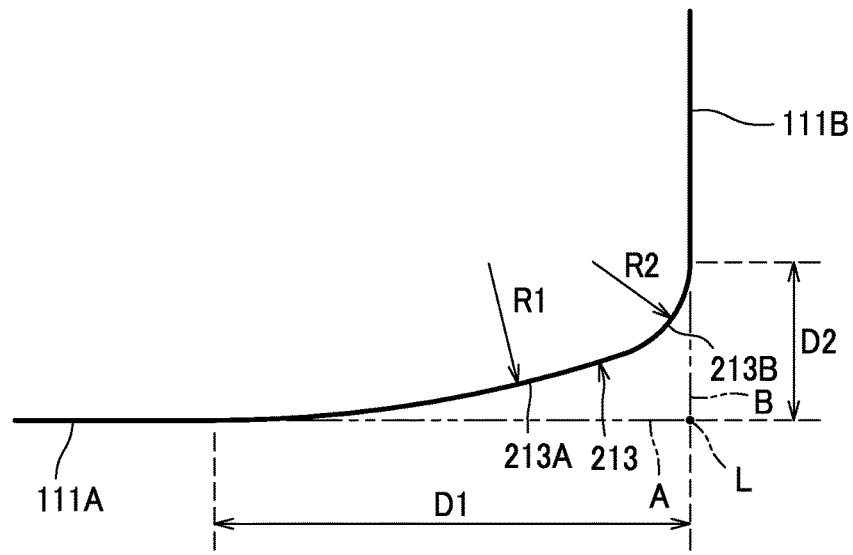
FIG. 9A is a view similar to FIG. 6 but showing a first modification.

In the above disclosure, the connecting surface 113 has a curved surface defined by a single cylindrical surface. However, the present invention is not limited to this specific configuration. For example, as seen in FIG. 9A, the connecting surface may have a curved surface defined by two cylindrical surfaces.

The connecting surface 213 configured as described above has different radii of curvatures including a larger radius of curvature R1 at a side closer to the first reflecting surface 111A and a smaller radius of curvature R2 at a side closer to the second reflecting surface 111B, and consists of a first curved surface 213A in the shape of a cylindrical surface having the radius of curvature R1 and a second curved surface 213B in the shape of a cylindrical surface having the radius of curvature R2 that is smaller than the radius of curvature R1. As viewed from the axial direction, the connecting surface 213 is configured to define a curved line made by connecting circular arcs each having a different radius. With this configuration, since the first reflecting surface 111A and the second reflecting surface 111B are smoothly connected, the molded product 110A can be easily removed from the second mold 142.

Figure 9B:
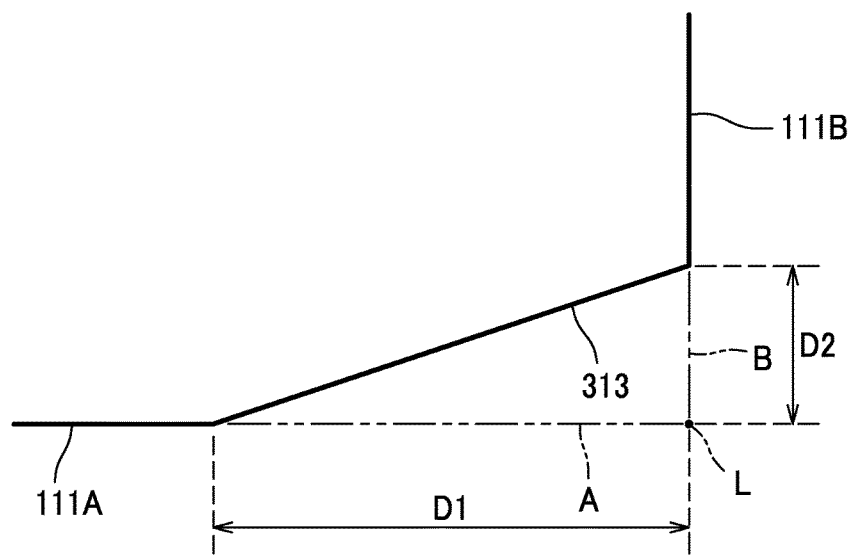
FIG. 9B is a view similar to FIG. 6 but showing a second modification.

Further, as seen in FIG. 9B, instead of the connecting surface having a curved surface, the connecting surface 313 has a flat surface. With this configuration, as compared to the configuration in which the connecting portion connecting the first reflecting surface 111A and the second reflecting surface 111B has a substantially right-angled portion, the shape of the connecting portion will be gentler. Further, similar to the above disclosure, it is preferable that the connecting surfaces 213, 313 shown in FIGS. 9A and 9B are configured to satisfy D1>D2.

Figure 10A:
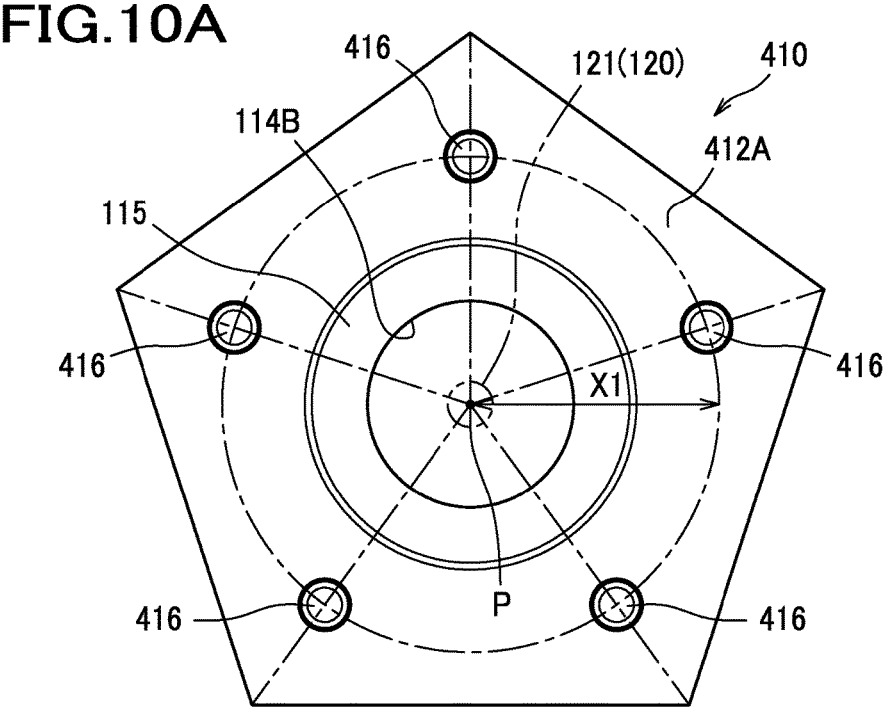
FIG. 10A is a top view of a polygon mirror according to a third modification as viewed from a first surface side.

In the above disclosure, the polygon mirror 110 has a substantially square bottom. However, the present invention is not limited to this specific configuration. For example, as seen in FIG. 10A, the polygon mirror may have a bottom (first surface 412A) in the shape of an equilateral pentagon.

The polygon mirror 410 configured as described above includes a plurality of (five) first protruding portions 416 each having a shape similar to that of the first protruding portion 116 in the above disclosure and protruding from the first surface 412A. The first protruding portions 416 are provided on the first surface 412A at positions equally distant from the axis of rotation P of the rotary shaft 121 of the motor 120 (i.e., center of the first surface 412A) between each of vertices of the first surface 412A and the axis of rotation P of the rotary shaft 121 (i.e., on lines connecting each of vertices of the first surface 412A and the axis of rotation P of the rotary shaft 121); the distances X1 from the axis of rotation P of the rotary shaft 121 are the same at all the first protruding portions 416. In other words, the first protruding portions 416 are arranged to maintain the same positional relations with respect to the closest vertices.

Figure 10B:
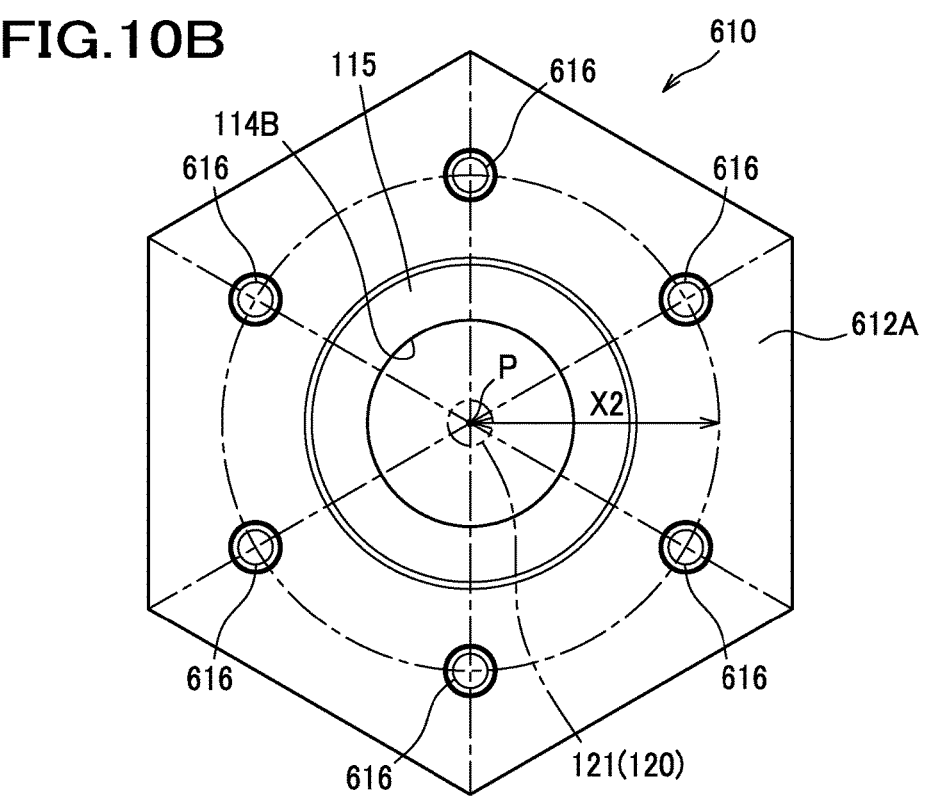
FIG. 10B is a top view of a polygon mirror according to a fourth modification as viewed from a first surface side.

Alternatively, as seen in FIG. 10B, the polygon mirror may have a bottom (first surface 612A) in the shape of an equilateral hexagon.

The polygon mirror 610 configured as described above includes a plurality of (six) first protruding portions 616 each protruding from the first surface 612A. The first protruding portions 616 are provided on the first surface 612A at positions equally distant from the axis of rotation P of the rotary shaft 121 of the motor 120 between each of vertices of the first surface 612A and the axis of rotation P of the rotary shaft 121 (i.e., on lines connecting each of vertices of the first surface 612A and the axis of rotation P of the rotary shaft 121; the distances X2 from the axis of rotation P of the rotary shaft 121 are the same at all the first protruding portions 616.

In the above disclosure, a plurality of first protruding portions 116 are provided. However, the present invention is not limited to this specific configuration. For example, as with the polygon mirror 510 shown in FIG. 11, a single circular ring-shaped first protruding portion 516 may be provided.

The first protruding portion 516 protrudes from the first surface 512A. The first protruding portion 516 has a pedestal-shaped section having a top surface parallel to the first surface 512A. The first protruding portion 516 is located outside the protruding portion 115 and extends with a constant width along the contour of the protruding portion 115. On the other hand, the pressing member (not shown in the drawing) in contact with the first protruding portion 516 is disposed at positions where the lines connecting each of vertices of the first surface 512A and the axis of rotation P of the rotary shaft 121 of the motor 120 intersect with the first protruding portion 516, and proximal end portions of the pressing member which are brought into contact with the first protrusion 516 are circular in shape as indicated by the chain double-dashed lines. In other words, the regions indicated by the chain double-dashed lines function as first contact portions 516A of the polygon mirror 510. Also in this modification, the first contact portions 516A are arranged to maintain the same positional relations with respect to the closest vertices.

Figure 11:
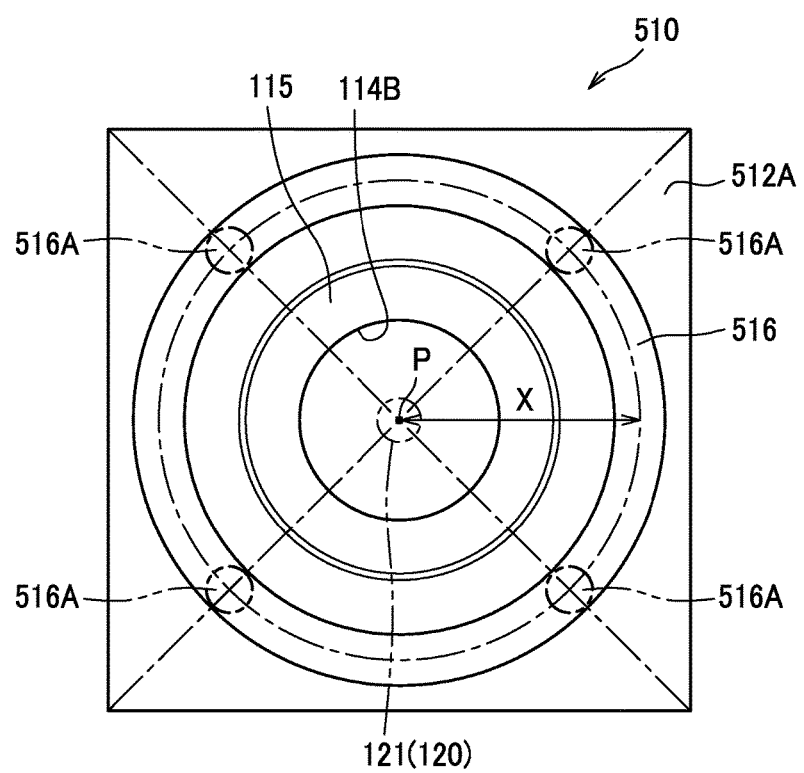
FIG. 11 is a top view of a polygon mirror according to a fifth modification as viewed from a first surface side.

In the modification as shown in FIG. 11, the first contact portion 516A may have a cross-section whose top surface is semi-circular in shape. Further, as long as the pressing member is configured to press the first surface 512A at positions corresponding to the first contact portions 516A, the first protrusion 516 may be omitted.

It should be noted that shapes of the connecting surface 113, the recessed portion 114, the protruding portion 115, the first protrusions 116, the second protrusions 117, and other parts of the polygon mirror 110 and the light deflector 100 in the above disclosure and modifications may be modified where necessary in accordance with the usage thereof.

In each of the above illustrative disclosure and modifications, the monochrome laser printer 1 has been described as an example of an image forming apparatus. However, the present invention is not limited to this type of laser printer, and may be applicable to other image forming apparatuses such as a color printer and a multifunction peripheral.

What is claimed is:

1. A light deflector comprising:
a polygon mirror made of plastic and having a plurality of reflecting surfaces;
a motor including a rotary shaft, stator and a rotor, and configured to rotate the polygon mirror, the rotary shaft rotating with the rotor, and the rotor having a rotor surface facing toward the polygon mirror and a rotor-side protruding portion protruding from the rotor surface toward the polygon mirror; and
a pressing member configured to press the polygon mirror toward the rotor in an axial direction of the motor, the pressing member being fastened to the rotary shaft,
wherein the polygon mirror comprises:
a first surface having a polygonal shape,
a second surface opposite to the first surface in the axial direction and having a polygonal shape, the second surface facing the rotor;
a plurality of first contact portions provided on the first surface and configured to be in contact with and pressed by the pressing member;
a recessed portion recessed from a center area of the second surface and having a bottom, the recessed portion having a circular shape as viewed from the axial direction; and
a through-hole formed in the bottom of the recessed portion at a center of the bottom and penetrating through the polygon mirror in the axial direction, the through-hole having a circular shape as viewed from the axial direction, and the through-hole having a diameter smaller than a diameter of the recessed portion,
wherein the number of the first contact portions is the same as the number of vertices of the first surface, and the first contact portions are provided at positions equally distant from an axis of the motor between each of vertices of the first surface and the axis of the motor, and
wherein the rotor-side protruding portion is in contact with the recessed portion in a radial direction of the recessed portion while an upper surface of the rotor-side protruding portion is spaced apart from the bottom of the recessed portion, and the rotary shaft is disposed to pass through the through-hole of the polygon mirror.

2. The light deflector according to claim 1, wherein the first contact portions protrude from the first surface of the polygon mirror.

3. The light deflector according to claim 2, wherein each of the first contact portions comprises a spherical surface.

4. The light deflector according to claim 2, wherein the polygon mirror further comprises a plurality of second contact portions configured to be in contact with the rotor, and the second contact portions are arranged on the second surface to overlap the first contact portions in the axial direction.

5. The light deflector according to claim 4, wherein the second contact portions protrude from the second surface.

6. The light deflector according to claim 1, wherein the first surface is shaped as a square.

7. The light deflector according to claim 6, wherein a distance from a center of the first surface to each of the first contact portions is in a range of 19-38% of a length of a diagonal line of the first surface.

8. A polygon mirror made of plastic and having a plurality of reflecting surfaces, the polygon mirror comprising:
a first surface having a polygonal shape and intersecting with the plurality of reflecting surfaces;

a second surface intersecting with the plurality of reflecting surfaces and opposite to the first surface;
a circular recessed portion formed at a center area of the second surface and configured to be recessed from the second surface, the circular recessed portion having a bottom surface;
a circular protruding portion protruding from the first surface and having a top surface, the circular protruding portion and the circular recessed portion overlapping one another in an axial direction orthogonal to the second surface;
a through-hole formed in the bottom surface of the circular recessed portion at a center of the bottom surface and penetrating through the top surface of the circular protruding portion in the axial direction, the through-hole having; a circular shape as viewed from the axial direction, and the through-hole having a diameter smaller than a diameter of the circular recessed portion; and
a plurality of protrusions provided on the first surface, wherein the number of the protrusions is the same as the number of vertices of the first surface, and the protrusions are provided at positions equal distant from a center of the first surface between each of vertices of the first surface and the center of the first surface.

9. The polygon mirror according to claim 8, wherein a diameter of the circular protruding portion is equal to or greater than that of the circular recessed portion.

10. The polygon mirror according to claim 8, wherein the plurality of protrusions are provided outside the circular protruding portion, and each of the protrusions comprises a spherical surface.

11. The polygon mirror according to claim 8, wherein a depth of the circular recessed portion from the second surface is greater than a height of the circular protruding portion from the first surface.

12. A light deflector comprising:
a polygon mirror made of plastic and having a plurality of reflecting surfaces;
a motor including a rotary shaft, stator and rotor, and configured to rotate the polygon mirror, the rotary shaft rotating with the rotor; and
wherein the polygon mirror comprises:
a first surface intersecting with the plurality of reflecting surfaces;
a second surface intersecting with the plurality of reflecting surfaces and opposite to the first surface;
a circular recessed portion formed at a center area of the second surface and configured to be recessed from the second surface, the circular recessed portion having a bottom surface;
a circular protruding portion protruding from the first surface and having a top surface, the circular protruding portion and the circular recessed portion overlapping one another in an axial direction orthogonal to the second surface;
a through-hole formed in the bottom surface of the circular recessed portion at a center of the bottom surface and penetrating through the top surface of the circular protruding portion in the axial direction, the through-hole having a circular shape as viewed from the axial direction, and the through-hole having a diameter smaller than a diameter of the circular recessed portion; and
wherein the rotor is in contact with the circular recessed portion in a radial direction of the circular recessed portion while an upper surface of the rotor is spaced apart from the bottom surface of the circular recessed portion, and the rotary shaft is disposed to pass through the through-hole of the polygon mirror.

13. The light deflector according to claim 12, wherein a diameter of the circular protruding portion is equal to or greater than that of the circular recessed portion.

14. The light deflector according to claim 12, wherein a spherical protrusion protruding from the first surface is provided outside the circular protruding portion.

15. The light deflector according to claim 14, wherein a a height of the spherical protrusion from the first surface is greater than a height of the circular protruding portion from the first surface.

16. The light deflector according to claim 12, wherein a depth of the circular recessed portion from the second surface is greater than a height of the circular protruding portion from the first surface.

17. The light deflector according to claim 12, wherein a depth of the circular recessed portion from the second surface is equal to or greater than half a distance between the first surface and the second surface.

* * * * *

UNITED STATES PATENT AND TRADEMARK OFFICE
CERTIFICATE OF CORRECTION

PATENT NO. : 9,778,457 B2
APPLICATION NO. : 14/616165
DATED : October 3, 2017
INVENTOR(S) : Kazuhiro Hayakawa et al.

Page 1 of 1

It is certified that error appears in the above-identified patent and that said Letters Patent is hereby corrected as shown below:

In the Claims

Claim 1:
Column 14, Line 29: Delete "through-hole having, a circular shape" and replace with -- through-hole having a circular shape -- therefor.

Claim 8:
Column 15, Line 23: Delete "equal" and replace with -- equally -- therefor.

Claim 15:
Column 16, Line 33: After "wherein", delete "a", second occurrence.

Signed and Sealed this
Twenty-sixth Day of June, 2018

Andrei Iancu
*Director of the United States Patent and Trademark Office*